United States Patent [19]
Kivenson

[11] 4,157,036
[45] Jun. 5, 1979

[54] LEVEL SENSOR FOR STORED FLUIDS AND PARTICULATE MATERIAL

[76] Inventor: Gilbert Kivenson, 22030 Wyandotte St., Canoga Park, Calif. 91303

[21] Appl. No.: 878,678

[22] Filed: Feb. 17, 1978

[51] Int. Cl.² ............................................. G01F 23/22
[52] U.S. Cl. ...................................... 73/290 R; 73/59
[58] Field of Search ............................ 73/290 R, 59

[56] References Cited

U.S. PATENT DOCUMENTS

| | | | |
|---|---|---|---|
| 2,975,636 | 3/1961 | Allen | 73/290 R |
| 3,115,769 | 12/1963 | Bowen, Jr. | 73/59 |

FOREIGN PATENT DOCUMENTS

| | | | |
|---|---|---|---|
| 1241137 | 5/1967 | Fed. Rep. of Germany | 73/290 R |
| 226880 | 9/1968 | U.S.S.R. | 73/290 R |
| 498493 | 3/1976 | U.S.S.R. | 73/290 R |

Primary Examiner—Richard C. Queisser
Assistant Examiner—Joseph W. Roskos

[57] ABSTRACT

A level sensing system for fluids and particulate material comprised of an immersed rotating body, an arrangement for measuring the resistance to rotation encountered by said body and a compensating method for reducing the effect of extraneous variables whereby said resistance varies primarily with changes in level. Output devices and controls attached to read and act from said resistance measurements can thus be calibrated in terms of fluid and particulate material levels in various storage vessels.

5 Claims, 9 Drawing Figures

LEVEL SENSOR FOR STORED FLUIDS AND PARTICULATE MATERIAL

BACKGROUND OF THE INVENTION

The present invention pertains to sensors which are useful for determining and controlling levels of liquid or powdered solids in containers. The measurement of level is a basic requirement in a widely varied group of industries; included, for example, are those which store or process water, oil, milk, grain, paint, dusts, powdered chemicals and cement. To serve the needs of these industries a variety of apparatus has been developed. A brief description will serve to outline prior art as it effects the present invention.

The simplest device used for liquids is the float gauge. In the latter a buoyant solid floats on top of the liquid contained in a tank and moves up and down with changes in level. The position of the float may be transmitted to the outside of the tank by means of a rope and pulley arrangement. The rope is attached at one end to the float and terminates at its other end in a moveable target. A stationary measuring scale adjacent to the target permits the observer to judge the level of liquid from outside the tank. If the tank is sealed, the level may be telemetered by placing a magnet inside the float and arranging the latter so that it must move past a series of magnetically responsive switches. As the float rises and falls, signals are obtained which can be used to actuate indicating devices positioned at remote points.

Another elementary device for liquid level indication is the sight gauge. A transparent tube is sealed into holes in the side of the container so as to constitute a vertical side arm. The tube is in hydraulic communication with both the liquid and the space above it; the liquid now fills the transparent tube to a level equal to that in the container. The level may be read directly or it may be converted to an equivalent signal by photoelectric or other means to permit telemetering and control.

Other methods for liquid level include: the measurement of pressure at the bottom of the container; the bubbling of air or other gas through a tube extending down into the liquid while measuring the pressure of the gas; the timing of ultrasonic pulses which are directed at and reflected from the interface between gas and liquid; the attenuation of gamma rays which pass down through the liquid; determining variations in weight of the entire container.

The measurement of level in vessels which hold powdered solids is somewhat more difficult and fewer methods are available. The timing of ultrasonic pulses directed from above has been successful in some cases. Another method involves the use of a plumb bob coupled to a motor and switch. The motor lowers the bob until the latter encounters solids and a slack is introduced in the bob's line. This triggers the switch and reverses the motor which now winds the bob up to its original position. The amount of line paid out is a measure of level. Another scheme for solids level sensing uses a horizontally positioned, vibrating tube which stops vibrating when it becomes immersed in the solids. The electric power fed to the vibrator coils changes sharply at this point; this change can be used to indicate that the level has reached or exceeded the position of the sensor. Because this method provides only a single point signal, it is necessary to use several sensors if intermediate level indications are required. A somewhat similar method employs a motor driven paddle mounted at some position in the vessel. When the paddle encounters solids, paddle torque rises sharply which results in a reactive torque on the flexibly-mounted motor. This actuates a switch to provide a single point signal. The drive motor continues to operate with the paddle immersed in the solids unless excessive torque is encountered in which case a second switch shuts off the motor.

Although each of the above described methods will operate well in situations to which it is suited, there are a growing number of applications for which none is totally satisfactory. In liquid level indications requiring high resolution, for example, some float devices are not suitable because of immersion depth uncertainty and because of friction in the various linkages required to operate the readout system. In the determination of liquid level interfaces in a situation where one liquid is floating on a second, floats and pressure measurement systems are not suitable because the liquids often have only a slight difference in density. Transparent tube indicators are sometimes unsatisfactory because the vessels contain dark liquids which stain the tubes and impede viewing.

Solids present special problems; present level indicators require several sensors for point to point measurement; this increases installacost and complexity. Sonic and gamma ray methods are often not accurate because of ray scattering by individual particles.

It is an object of the present invention to provide an apparatus suitable for determining the level of liquids in tanks and for measuring the interface between two immiscible liquids stored in a container. It is a further object of this invention to provide an apparatus which gives continuous level indication of powders, granulated solids and other particulates.

SUMMARY OF THE INVENTION

Many level indicators for liquids employ some density related property as a means for deriving a level-dependent signal. A few solids level sensors such as the vibrating tube and rotating paddle types discussed previously depend on a different property: the resistance to displacement of the material. Up to this time this property has been used only for single point measurements. The measurement of displacement resistance has, however, potential for an accurate gauging of the entire level with the use of one sensor.

The present invention makes full use of the displacement resistance principle. It does so by the employment of a rotating symmetrical body immersed in the liquid or solid and the measurement of reactive torque at various levels. It then derives a signal which is proportional to the level of the material.

In the motion of a solid body through a liquid the resistance encountered by the body is a function of its speed, its immersed area and the liquid's viscosity. If speed is controlled, the viscosity does not vary and if the body is uniform, then resistance becomes a function of immersion depth only. Unfortunately liquid viscosity is highly dependent on temperature so that the requirement of maintaining this property constant would make necessary an expensive thermostating apparatus. In the present invention this requirement is overcome by the use of a speed adjusting system which alters the sensed resistance to motion as the latter varies with viscosity. The residual variation in resistance is then dependent on level only.

With powdered solids and the like resistance to motion is not, in general, temperature dependent. It is possible therefore to employ a simpler embodiment of the invention.

DESCRIPTION OF THE INVENTION

Figure 1:
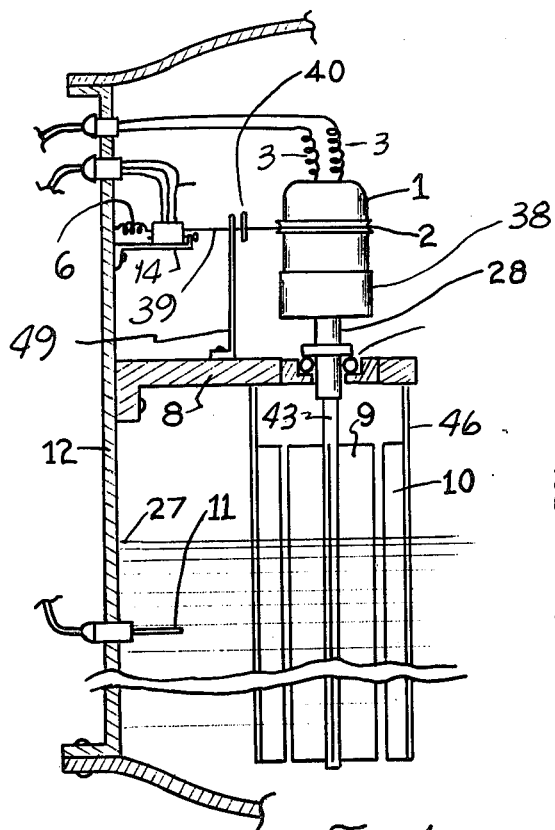
FIG. 1 is a side, cut-away view of the invention as it would be mounted in a vessel containing liquid.
Figure 2:
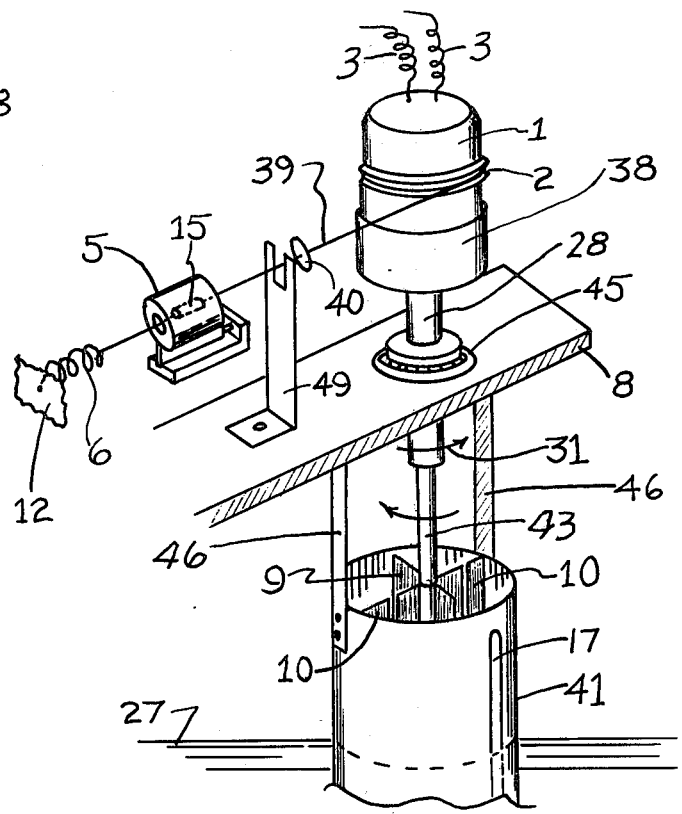
FIG. 2 is an isometric view of the embodiment shown in FIG. 1.
Figure 3:
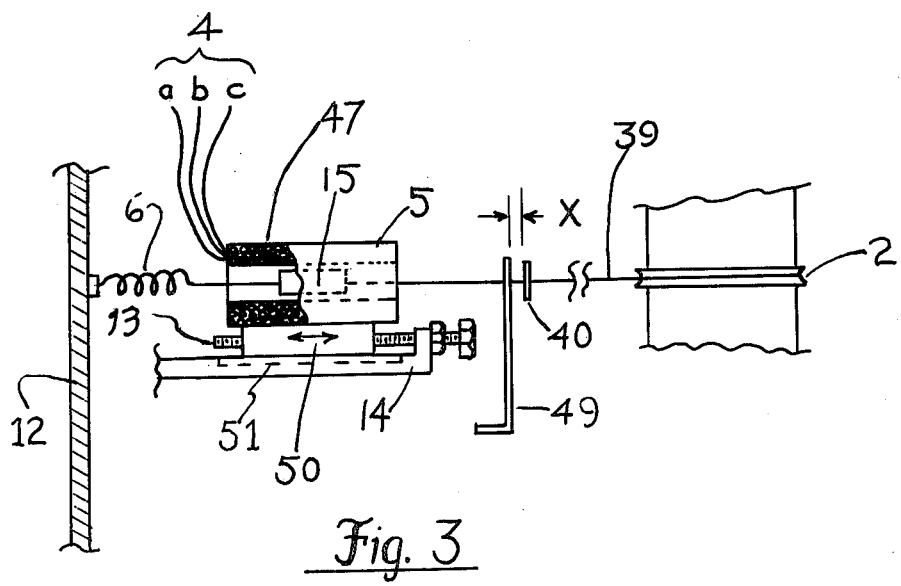
FIG. 3 is an enlarged and detailed drawing of a transducer system suitable for use in the invention.

The invention will be described with reference to FIGS. 1 through 9. In FIGS. 1 and 2 an electric motor 1 is coupled through a reduction gear box 38 to the shaft 43. The shaft extends nearly to the bottom of vessel 12 and is provided with the vanes 9. A boss 28 extending from from the gear box housing passes through a thrust bearing 45 which is contained in the support bracket 8. When the motor is delivering power against any load encountered by the shaft 43, the motor frame and gear box assembly will experience a reactive torque which is equal in magnitude and opposite in direction to the torque produced by the shaft. Thus rotation of the motor shaft in direction 30 shown in FIG. 2 would tend to produce counter-rotation 31 in the motor frame and gear box. Counter-rotation is prevented by a cord 39 which is wrapped several times around and secured to the pulley 2 at one end and anchored at its other end through spring 6 to the side of the vessel 12. A core 15 of a linearly variable differential transformer 5, henceforth abbreviated LVDT, is incorporated into the cord 39 as is shown in FIGS. 2 and 3.

With some fixed level of material 27 in the vessel, rotation of the assembly comprised of shaft 43 and the vanes 9 will be resisted by the force required to displace the material. The resistance will increase with rise in level 27 and decrease with a fall in level. If the motor speed is maintained constant, the torque delivered to shaft 43 will then vary with level as will the counter-torque on the motor frame. Spring 6 will be extended by cord 39 to a degree which depends on level. The core 15 of the LVDT will move horizontally by an amount which is proportional to the angular movement of the motor frame. The coils 47 of the LVDT will then provide a signal which can be related to the level 27.

A reverse motion limiting assembly comprising the disk 40 and the stop 49 prevents slack and possible unwinding of cord 39 when the motor is turned off. A desirable adjustment for the limiting assembly is for the spacing X in FIG. 3 to occur when the motor is running and the vessel is empty. The adjustment would be such that X would be exactly zero with the motor off.

Figure 4:
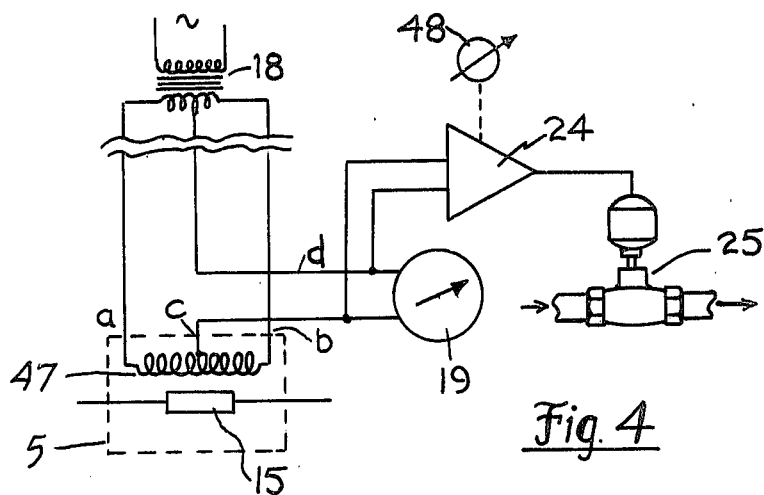
FIG. 4 is a circuit diagram showing the transducer connected to readout and control means.
Figure 5:
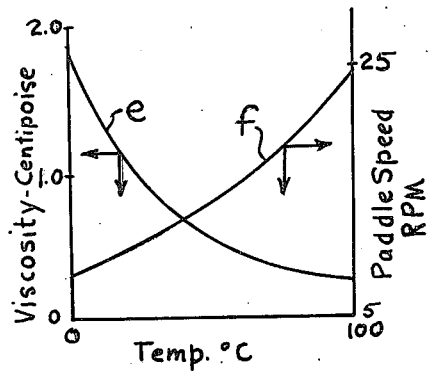
FIG. 5 is a graph of parameters affecting the operation of the invention.

The core 15 may be in the form of a slotted ferromagnetic cylinder which is slipped over the cord 39 and cemented in place. The coil 47 of the LVDT is in the form of a center tapped winding surrounding the core 15. As is shown in FIG. 4 it is fed by and external transformer 18 which is provided with a center tapped secondary. With the core at the exact electrical center of the LVDT, zero signal appears between the output leads c and d. As the core is displaced from electrical center, the LVDT output increases to produce a signal in the readout device 19. The output is also connected to the signal conditioning and control amplifier 24 into which a set point 48 has been entered. Whenever the level drops below the set point, the output of the LVDT is sufficient to produce an unbalance in amplifier 24. Filling means 25 is actuated to restore the level to its original value whereupon the system is again brought back into balance.

The method for achieving electrical zero in the LVDT has been shown in FIG. 3. A mounting block 50 and a screw 13 permit adjustment of the LVDT coil 47 with respect to core 15. Block 50 is slidably retained by dovetail groove 51 in the support plate 14. Horizontal position of coil 47 is varied by turning screw 13 until zero electrical output is obtained with the motor running and the vessel empty.

The viscosity of liquids is highly temperature dependent. If the level sensing apparatus is to be used with liquids, this dependency must be taken into account. The torque required to rotate the vanes through a liquid may be expressed by $T = k N V h$ where T is the torque, N is the rotational speed, V is the viscosity k is a constant of proportionality, and h is the immersion depth of the vane assembly. This equation applies at relatively low rotational speeds, the so-called viscous flow region. IF N and V remain constant, then torque would be dependent only on h and would be a measure of level. If V varies with temperature, however, then torque will vary even though level remains constant. This problem is overcome in the present invention by maintaining the product of N and V, $N \times V$, constant. When viscosity decreases, the rotational speed is increased by an amount to maintain a constant N V product. The relationship between viscosity and temperature for water is shown by curve e in FIG. 5. If temperature of water in a vessel should increase, the torque produced by the motor would decrease. Motor speed would then be raised to restore the torque to its original value. With this compensation the torque would then become a linear function of level and level only.

Figure 6:
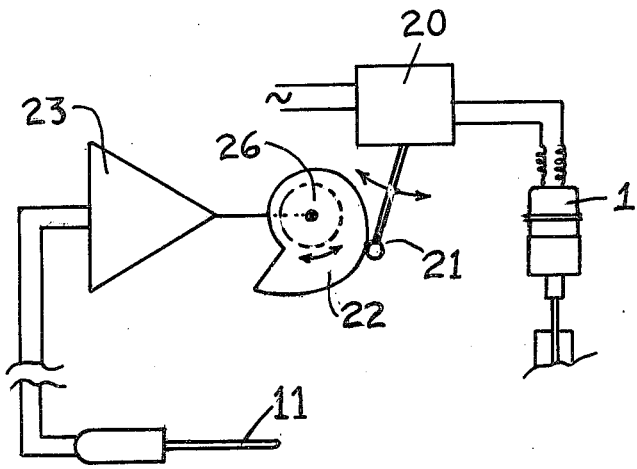
FIG. 6 is a circuit diagram of a temperature-responsive speed control system for use with the invention.

One arrangement for achieving temperature compensation is shown in FIG. 6. A thermocouple 11, also shown in position in FIG. 1, senses liquid temperature and supplies a proportional signal to servo amplifier 23. A servo motor 26 is driven to an angular position which is a function of temperature as sensed by the thermocouple. A cam 22 attached to the servo motor shaft moves a follower 21 which operates the speed control 20. As temperature increases, the speed of motor 1 will be increased by an amount determined by the position and shape of cam 22. A curve of viscosity versus temperature for the particular liquid to be gauged will provide a basis for the cutting of cam 22. The curve f in FIG. 5 was derived for a particular apparatus for use in water tanks. The controller 20 may be of the variable frequency type and a synchronous motor used as the vane assembly drive. Another type of controller useable for this application employs silicon controlled rectifiers, a universal motor and tachometer feedback. Other means for achieving motor speed control are known to those skilled in the art. It is also possible to fit an equation to the viscosity temperature curve, store the equation in a computer memory, digitize the temperature signal and to derive the proper motor speed setting from the computer.

The application of the invention to two-phase, immiscible liquid systems requires the maintaining of constant overall level by an auxilliary means such as a float or overflow pipe. As the interface between phases varies, the torque will represent the combined resistance of the two phases and will be proportional to the interface level. In the case of oil floating on water, for example, torque will decrease as the interface rises and increase when it drops. In this application the effect of viscosity variations with temperature would be avoided by the use of thermostating.

Another consideration in the use of the present invention with liquids is the prevention of circulating currents. At low to moderate rotary speeds it is possible to set up a column of liquid which rotates with the vane assembly and thus reduces the torque experienced by the motor drive. The baffles 10, shown in FIGS. 1 and 2, interrupt the circulation and thus increase the effective signal.

With vessels using side inlet or outlet connections horizontal currents will often be created. These currents may cause vane pressures and produce noisy signals. In these cases the shield 41, shown in FIG. 2, may be used. Slots 17 provide hydraulic communication with the remainder of the liquid but minimize horizontal currents. Shield 47 is mounted by brackets 46 to support bracket 8.

Figures 7A, 7B:
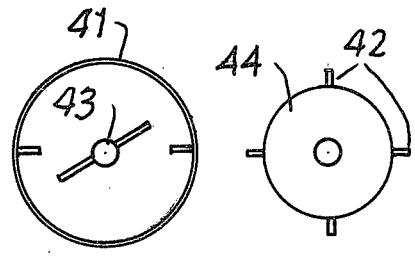
FIG. 7 shows the top views of three paddle configurations for use with the invention.

When the invention is used with powdered solids, viscosity-temperature effects are minor and no compensating means is usually necessary. Attention must however be paid to the design of the vanes and the baffles. If the solids are fine, dry and readily flowing, vane construction may be similar to that used with liquids. Fewer and smaller vanes, as is shown in FIG. 7A, may be required because of the increased torque produced in solids. A shield 41 may be necessary if admission of solids to the container imposes lateral forces on the vane structure. If baffles are used, their clearance with the vanes must be greater than the diameter or length of the largest particle. With some solids torques may become excessive when vane structures similar to those shown in FIGS. 1,2 and 7A are used. Torques may be reduced by employing cylindrically shaped rotating structure. If the solids are wet however, the rotating structure will form a semi-permanent hollow volume in the material. This effect, sometimes called channeling, will have the effect of making the apparatus insensitive. It is possible to overcome this problem by the use of the vestigial vanes 42 attached to the cylindrical body as is shown in FIG. 7B. These vanes break down the walls of the channel and expose the turning member 44 to a solids level representative of that in the main body of the vessel.

Figure 7C:
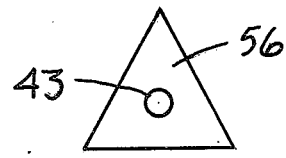

A prismatic form 56 shown in FIG. 7C is useful with some wet solids. The further application of the invention to solids, slurries, sludges, and suspensions require only engineering skill; variations to meet these conditions do not depart from the spirit of the present invention.

Figure 8:
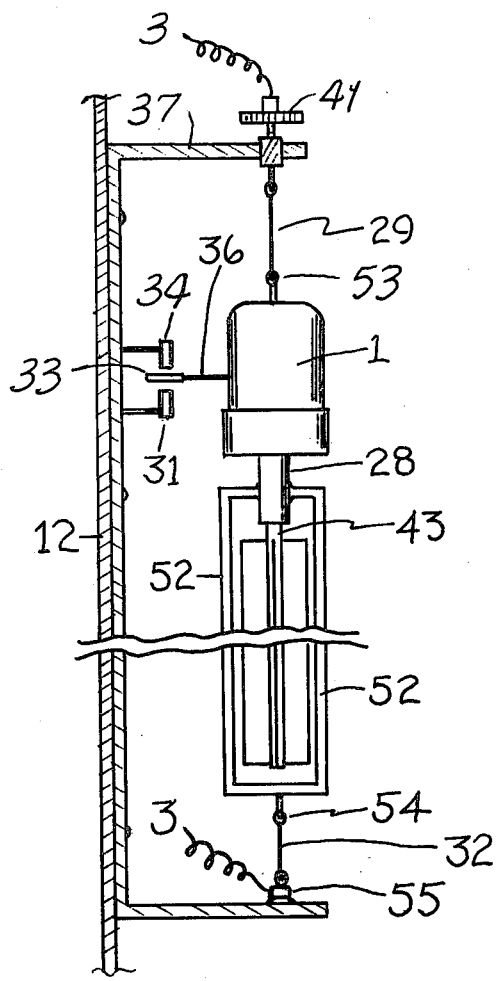
FIG. 8 is a side, cut-away view of another embodiment of the invention.
Figure 9:
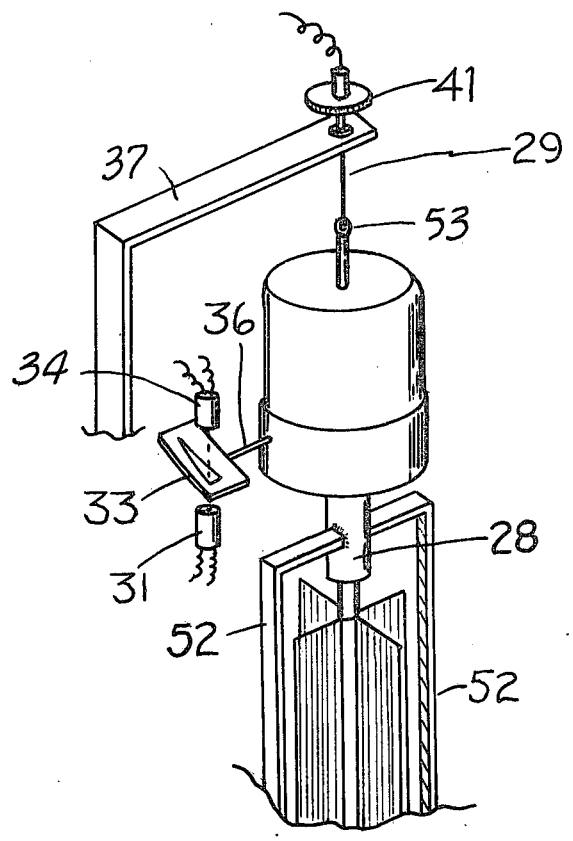
FIG. 9 is an isometric view of the embodiment shown in FIG. 8.

A further embodiment of the invention is shown in FIGS. 8 and 9. In this embodiment the motor and vane assembly are suspended by the torsion wires 29 and 32 which terminate on opposing ends of the U-shaped bracket 37. Bracket 52 is firmly attached to the motor boss 28. Bracket 52 terminates at its lower end in the eye 54 which accommodates torsion wire 32 as is shown in FIG. 8. An electrically insulated fastener 55 serves to anchor the lower end of torsion wire 32. The upper torsion wire is connected to the motor at eye 53 and terminates in the tension adjustment 41. In this embodiment of the invention the torsion wires 29 and 32 serve three functions: (a) they eliminate the need for a thrust bearing as is used in the previous embodiment (b) they provide spring return resistance and (c) they serve as electrical leads for powering the motor.

The transducer illustrated in the embodiment shown in FIGS. 8 and 9 is of the photoelectric cell type. It is comprised of the collimated light source 34, the photoelectric cell 31 and the slotted mask 33. Changes in the angular position of motor 1 are transmitted through extension 36 to the mask 33 and alter the amount of light falling on the photoelectric cell. The signal obtained is thus proportional to the motor deflection and to the level of material in the vessel 12.

Many other transducer, mounting and vane arrangements can be devised. It would be possible for example to make use of capacitative or strain gauge type of transducers.

These and other modifications are possible without departing from the general principles and scope defined in the following claims.

I claim:

1. An apparatus for detecting, remotely indicating and controlling the level of materials contained in walled vessels at varying temperatures comprising in combination:
    a. means for rotating a vertically oriented and elongated body through said materials;
    b. means for making measurements of the resistance to motion encountered by said vertically oriented and elongated body as it rotates and for converting said measurements to equivalent signals;
    c. means for the transmission of said signals to indicating and control devices positioned externally to said vessels;
    d. means for the compensation of temperature induced changes in the said resistance to motion offered by said materials.

2. An apparatus for detecting, remotely indicating and controlling the level of materials in vessels as set forth in claim 1 in which said means for rotating a vertically oriented and elongated body is comprised of a controlled speed motor having a rotatably mounted frame and flexibly joined power leads whereby resistive torque encountered by the shaft of said motor will produce counter torque in said rotatably mounted frame.

3. An apparatus for detecting, remotely indicating and controlling the level of materials in vessels as set forth in claim 1 in which said means for transmission comprise in combination:
    a. a flexible restraint coupled in an off axis orientation between said rotatably mounted frame and a stationary base whereby rotary torque produced by the motor frame will cause proportional flexure in said restraint;
    b. a motion sensor incorporated within said flexible restraint whereby flexure of the restraint will result in signals proportional to the amount of flexure;
    c. signal coupling and transporting means between said motion sensor and external locations;
    d. signal amplifying and conditioning means at said external locations wherein said signals are processed to permit the operation of level indicating and controlling equipment.

4. An apparatus for detecting, remotely indicating and controlling the level of materials in vessels as set forth in claim 1 in which said means of compensation comprises a temperature sensitive motor speed control which varies speed automatically with varying temperatures according to a preset program, this having the effect of compensating for changes in viscosity when said materials are liquids.

5. An apparatus for detecting, remotely indicating and controlling the level of material in vessels as set forth in claim 1 in which said means of compensation comprise the shaping of said vertically oriented and elongated body so as to minimize the formation of channels in the material, thus having the effect of exposing said body more completely to changes in level when the material is non-readily flowing, powdered solid.

* * * * *